(12) United States Patent
De Oliveira

(10) Patent No.: US 7,016,347 B2
(45) Date of Patent: Mar. 21, 2006

(54) UPDATING RADIO NETWORK DATA IN AN IP BASE STATION USING AN IP MESSAGE

(75) Inventor: Fernando De Oliveira, St-Laurent (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 510 days.

(21) Appl. No.: 09/727,189

(22) Filed: Nov. 30, 2000

(65) Prior Publication Data

US 2002/0093943 A1    Jul. 18, 2002

(51) Int. Cl.
*H04L 12/56*    (2006.01)
(52) U.S. Cl. ...................................... 370/389; 370/328
(58) Field of Classification Search .............. 370/238, 370/312, 328, 338, 352–356, 401, 408, 432, 370/475, 329, 466, 467, 389, 392; 455/426, 455/436, 433, 503
See application file for complete search history.

(56) References Cited

U.S. PATENT DOCUMENTS

| | | | | |
|---|---|---|---|---|
| 6,078,575 A * | 6/2000 | Dommety et al. | ........... | 370/338 |
| 6,212,175 B1 * | 4/2001 | Harsch | ........................ | 370/338 |
| 6,424,638 B1 * | 7/2002 | Ray et al. | .................... | 370/331 |
| 6,424,639 B1 * | 7/2002 | Lioy et al. | ................... | 370/338 |
| 6,434,396 B1 * | 8/2002 | Rune | ........................... | 455/502 |
| 6,477,150 B1 * | 11/2002 | Maggenti et al. | ........... | 370/312 |
| 6,542,755 B1 * | 4/2003 | Tsukagoshi | ................. | 455/503 |
| 6,577,643 B1 * | 6/2003 | Rai et al. | .................... | 370/466 |
| 6,633,765 B1 * | 10/2003 | Maggenti | .................... | 455/503 |
| 6,654,359 B1 * | 11/2003 | La Porta et al. | ............ | 370/328 |
| 6,735,441 B1 * | 5/2004 | Turgeon et al. | ............. | 455/433 |

* cited by examiner

*Primary Examiner*—John Pezzlo
(74) *Attorney, Agent, or Firm*—Smith, Danamraj & Youst, P.C.

(57) ABSTRACT

A system and method of updating radio network data in a plurality of devices deployed in Base Stations (BSs) in a radio telecommunications network. Each BS is interfaced with a Mobile Switching Center (MSC) through an Internet Protocol (IP) packet data network. Device update data is sent in an IP message from the MSC to the BS where the plurality of devices are simultaneously updated. Device updates can be performed at the cell level, the location area level, or the exchange level. In one embodiment, the BS joins a multicast group, and the device update data is sent in an IP multicast message. In another embodiment, the BSs monitor predefined User Datagram Protocol (UDP) ports for particular types of device update data, and the device update data is sent in an IP broadcast message.

12 Claims, 4 Drawing Sheets

UPDATING RADIO NETWORK DATA IN AN IP BASE STATION USING AN IP MESSAGE

BACKGROUND OF THE INVENTION

1. Technical Field of the Invention

This invention relates to telecommunication systems and, more particularly, to a system and method of updating radio network data in Internet Protocol (IP) Base Stations.

2. Description of Related Art

When system updates are performed in a radio telecommunications network, they often require that individual devices in the network's Base Stations (BSs) be updated to transmit new information over the air interface to mobile stations (MSs) operating in the service area of the network. Radio network data is sent from Mobile Switching Centers (MSCs) in the network to the BSs where the data is used to update a variety of BS devices performing different functions. For example, data may be sent to update Digital Control Channel (DCCH) devices and Digital Traffic Channel (DTC) devices. The term "devices" generally refers to the software that controls hardware devices such as transceivers, signal strength receivers, location verification modules, and so on. "Updates" may refer to radio network data updates or software updates to provide new device functionality. For example, a radio network data update may provide a channel number to a particular device. A software update may change the functionality of a device from a DTC device to a DCCH device in the event of a DCCH failure.

Some of the network data may be applicable at the cell level, and thus are applicable to all of the devices of a particular type in only a single BS. At other times, the network data may be applicable at the exchange level, and thus are applicable to all of the devices of a particular type in all of the BSs in the network. The current method of updating device data at the cell level or exchange level involves sending a separate message from the MSC to each device to be updated. Since each BS has multiple DCCHs and DTCs, many duplicate messages containing the same information are sent to the BS devices. For example, whenever the power-down registration status in the network is changed, one message is sent to each DCCH in the network. There may be up to 8 DCCHs per BS, and it is not unusual to have approximately 400 BSs in a typical network. Thus, a total of 3200 messages are required for the update.

The existing method obviously consumes a lot of processor time to send the messages, and consumes much of the signaling capacity between the MSCs and the BSs. It would be advantageous to have a system and method of updating radio network data that reduces the number of messages required, thereby reducing the processor load and signaling load on the network. The present invention provides such a system and method.

SUMMARY OF THE INVENTION

In one aspect, the present invention is a method of updating radio network data in a plurality of devices deployed in a Base Station (BS) in a radio telecommunications network. The method includes the steps of interfacing the BS with a Mobile Switching Center (MSC) through an Internet Protocol (IP) packet data network, assigning the BS an IP address, sending device update data from the MSC to the BS in an IP message, and simultaneously updating the plurality of devices by the BS. In one embodiment, the BS joins a multicast group, and the device update data is sent in an IP multicast message. In another embodiment, the BS monitors predefined User Datagram Protocol (UDP) ports for particular types of device update data, and the device update data is sent in an IP broadcast message.

In another aspect, the method of the present invention includes the steps of interfacing the BS with an MSC through an IP packet data network, assigning each of the plurality of devices an IP address, and sending device update data from the MSC to each of the plurality of devices in an IP message. In one embodiment, the IP message is an IP multicast message, and in another embodiment, the IP message is an IP broadcast message.

In another aspect, the present invention is a system in a radio telecommunications network for updating radio network data in a plurality of devices deployed in a BS in the network. The system comprises an IP packet data network for interfacing the BS with an MSC, an IP message transmitter in the MSC for sending device update data from the MSC to the BS in an IP message, and means within the BS for simultaneously updating the plurality of devices. In one embodiment, the IP message transmitter sends the device update data in an IP multicast message. In another embodiment, the IP message transmitter sends the device update data in an IP broadcast message.

In yet another aspect, the present invention is an IP Base Station in a radio telecommunications network. The BS comprises a plurality of radio network devices, a signaling mechanism for receiving IP messages containing device update data from an MSC through an IP packet data network, and means within the BS for simultaneously updating the plurality of devices with the device update data. In one embodiment, the signaling mechanism receives IP multicast messages that contain device update data. In another embodiment, the signaling mechanism includes at least one UDP port for monitoring IP broadcast messages containing device update data.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
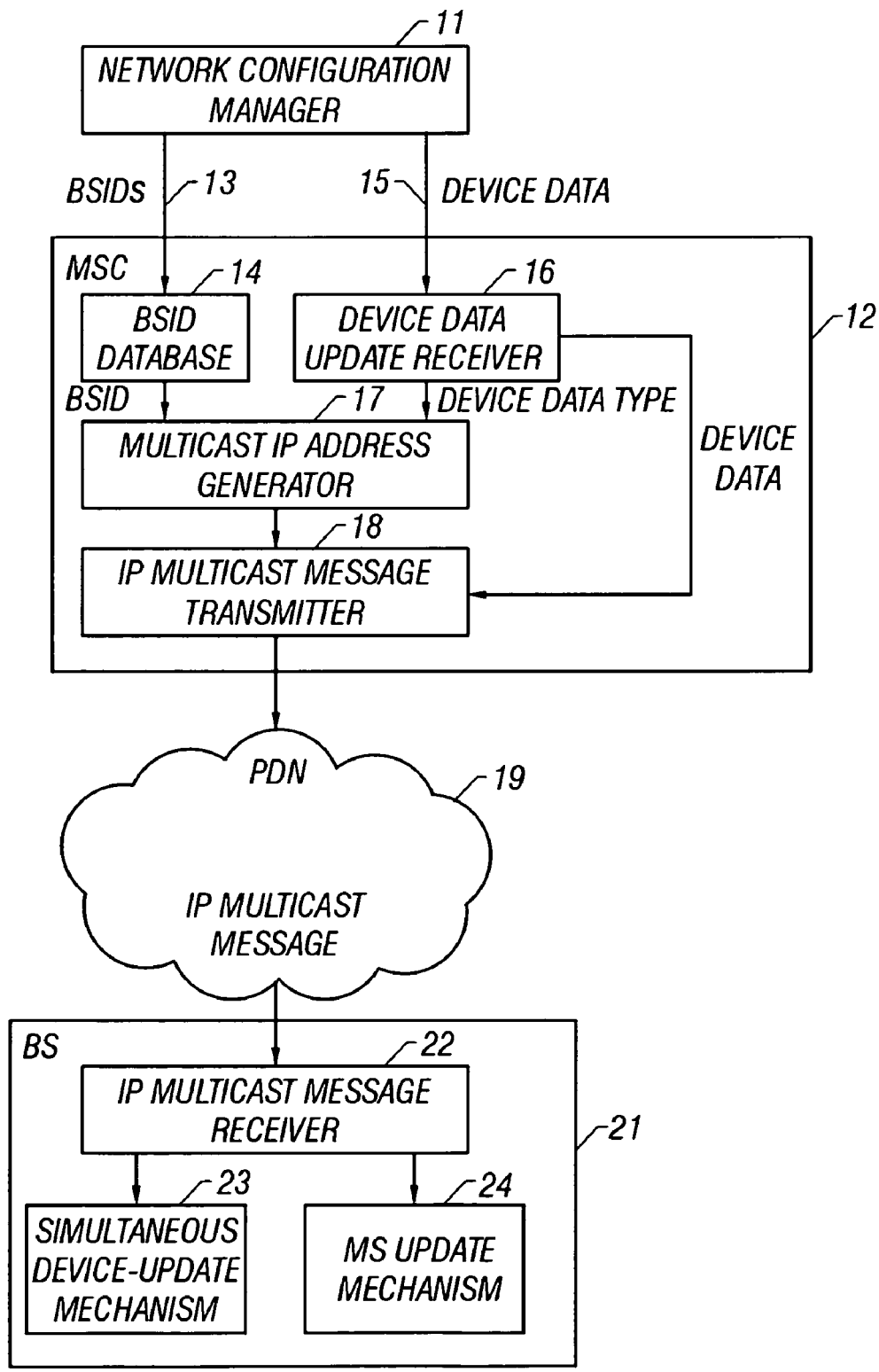
FIG. 1 is a simplified block diagram of a first embodiment of the system of the present invention.

The present invention builds upon the premise that information at the cell level or exchange level does not have to be sent to the devices one at a time. For example, the fact that a new service is provided should apply to all of the DCCHs in a cell, and probably to all of the DCCHs in the network since all of the control channels need to broadcast the new service information. The present invention provides a fast method to distribute radio network data from the MSC to IP-based base stations using minimal signaling.

In networks that communicate between nodes utilizing the Internet Protocol (IP), message data is divided into a plurality of data packets, each having an identifying header that includes a source and destination address for the packet. The packets are then transmitted from the source to the destination through a plurality of routers in a connectionless packet-switched network. Additionally, the packets may be addressed to a plurality of destinations, and the packets are accordingly routed to each of the destinations.

In the present invention, the MSCs and BSs in the network are connected through a packet data network, and in a first embodiment, an IP multicast message is used to update radio network data in IP-based BSs. Multicast is a datagram network protocol that enables an application to place a single packet on a network and have that packet transported to multiple recipients. With multicast, the packet is sent to a multicast group, which is simply an IP address that falls into IP class D (224.0.0.0 through 239.255.255.255). Recipients express an interest in receiving packets addressed to a particular multicast group. When sending a packet to the multicast group, a client inserts a packet into the network with the appropriate target address. The packet is then picked up by any host that is interested in that group.

In terms of the present invention, each BS and each base station device can be considered a host (it has an IP address). In IPv4, an IP address currently comprises 4 bytes (32 bits) in the format byte1.byte2.byte3.byte4. Each BS is associated with a unique network identifier such as its Base Station Identification (BSID) which, in the preferred embodiment, is based on the last 12 bits of its IP address: 4 bits of byte3 and all 8 bits of byte4. For instance, if the IP address of a BS is 139.12.2.4, the BSID is 2.4 (h'204). This example provides a range of BSIDs from 1 to 4095. This way of identifying the BS also applies to newer versions of IP such as IPv6, which allows for IP addresses of 128 bits.

Each base station device is associated with a device data type. Although there are several types of devices in the BS, the description herein is focused on two exemplary device data types: DCCH device data and DTC device data. In the exemplary multicast IP addresses constructed herein, 1 indicates DCCH device data, and 2 indicates DTC device data.

For cell-level updates, the multicast IP addresses are constructed based on the multicast group, device data type, and the BSID. The basic format of the cell-level multicast IP address is shown as:

239.device data type.BSID

Obviously, the MSC must maintain a database of BSIDs for all of the BSs in order to construct proper multicast IP addresses. For exchange-level updates, the multicast IP address is constructed based on the device data type, and utilizes an unassigned BSID such as 0.0. Thus, the basic format of the exchange-level multicast IP address is shown as:

239.device data type.0.0

BSID 0.0 is reserved for exchange-level updates, i.e. no base station in the network is assigned an IP address ending with 0.0. The BSs may also be divided into other groupings that are to receive particular types of updates. For example, an update may be applicable to all of the BSs in a particular Location Area. In this case, after being informed about their Location Area, the BSs also join a multicast group comprising:

239.device data type.255.location area ID in which the third byte (255) indicates Location Area updates.

Some data is directed to individual devices, such as channel number or specific configuration data. That data should be directed to devices one at a time. This data can be sent to the base station multicast address, indicating within the message that it is for a particular device. The BS then updates the particular device. Alternatively, each device may be assigned its own IP address, and the message is sent directly to the device. The first option is preferred since there is less configuration required.

If each device in a BS is assigned its own IP address, then each device joins the multicast group corresponding to its device data type. For example, in a BS having a BSID of 23.45, each DCCH joins multicast group 239.1.23.45 for cell-level updates, and joins multicast group 239.1.0.0 for exchange-level updates. Likewise, each DTC in the same BS joins multicast group 239.2.23.45 for cell-level updates, and joins multicast group 239.2.0.0 for exchange-level updates.

When updating radio network data at the cell level, the MSC sends one message to the multicast group comprising 239.device data type.BSID for each device type. When updating radio network data at the exchange level, the MSC sends one message to the multicast address 239.device data type.0.0 for each device type. In both cases, the devices that joined the relevant multicast group receive the message. When the message is received, the BS may determine whether to immediately use the data or store it for use at a later designated time. At the designated time, the BS updates the appropriate devices indicated by the device data type in the message. For example, all of the DCCHs may be updated in the BS. The BS can then transmit related update information to the MSs operating in its cell. Using the present invention, the number of messages required to update a parameter at the exchange level is reduced from a typical 3,000 messages in existing networks to one message sent to the multicast group IP address. Thus, to update all of the DCCHs in the network, only one multicast messages must be sent by the MSC.

FIG. 1 is a simplified block diagram of the first embodiment of the system of the present invention. A Network Configuration Manager (NCM) 11 provides an MSC 12 with BSIDs 13 for each of the BSs in the network. The MSC stores the BSIDs in a BSID database 14. The NCM also provides updates for device data 15 to the MSC. These updates are received in a function that can be called a Device Data Update Receiver 16. For cell-level updates, a Multicast IP Address Generator 17 in the MSC uses a BSID from the database and a device data type from the device update data to generate a multicast IP address. An IP Multicast Message Transmitter 18 then places the device data in an IP message and sends it over a Packet Data Network (PDN) 19 to the multicast IP address. As noted above, exchange-level updates utilize a BSID of 0.0 in the multicast IP address.

A BS 21 that has joined the multicast group designated in the multicast IP address receives the message in an IP Multicast Message Receiver 22. The BS determines whether the update is to be performed immediately, or at a designated time. The BS also determines whether the update is applicable to a single device or all of the devices of the indicated type. If the update is applicable to all of the devices of the indicated type, a Simultaneous Device-Update Mechanism 23 then updates all of the devices at once. An MS Update Mechanism 24 then sends related update information to the MSs operating in the BS's cell.

Figure 2:
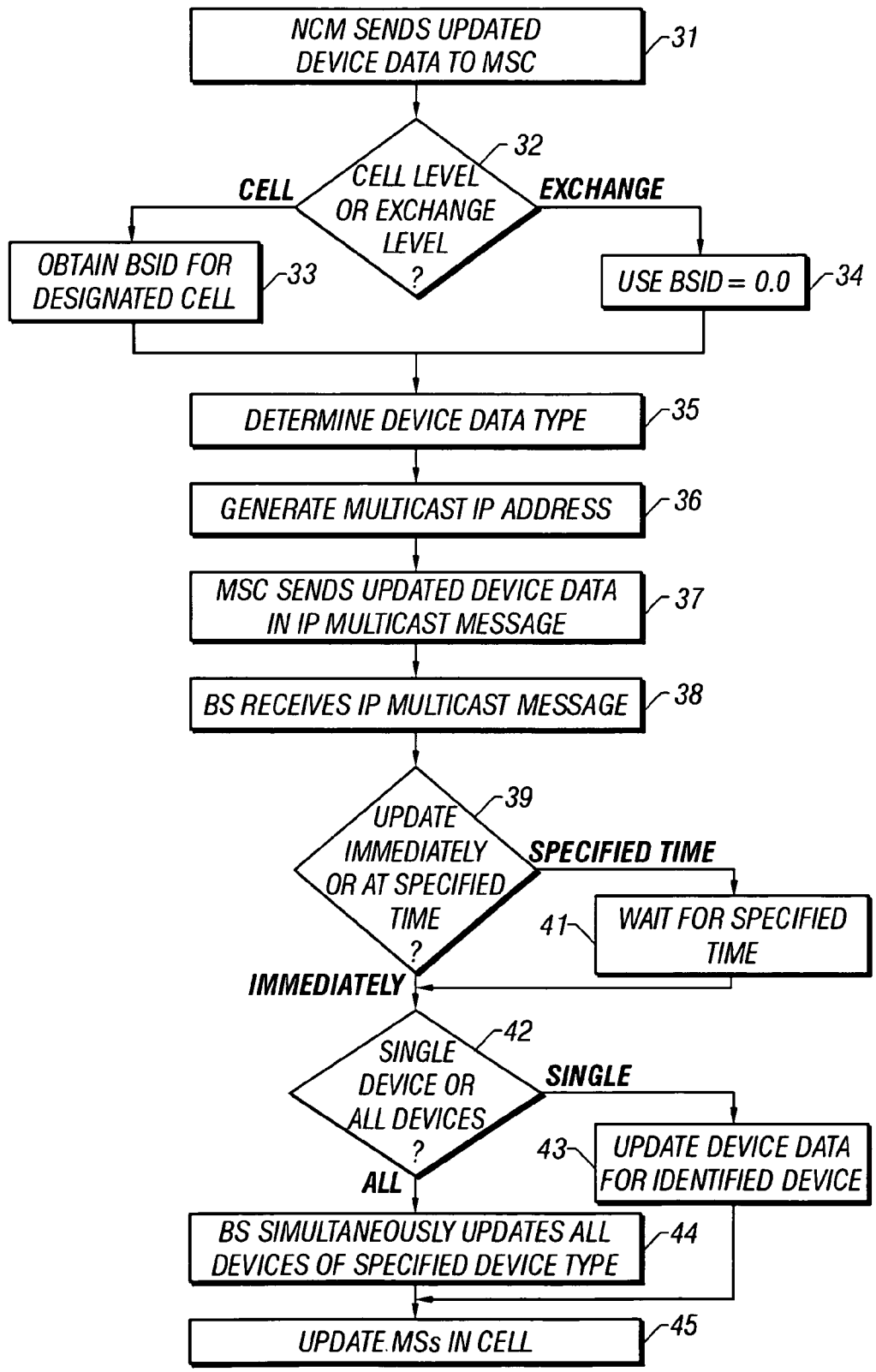
FIG. 2 is a flow chart illustrating the steps of a first embodiment of the method of the present invention.

FIG. 2 is a flow chart illustrating the steps of a first embodiment of the method of the present invention. At step 31, the NCM 11 sends updated device data to the MSC 12. At 32, the MSC determines whether the updated data is applicable at the cell level or the exchange level. For cell-level updates, the method moves to step 33 where a BSID is obtained for the designated cell from the database 14. For exchange-level updates, the method moves to step 34 where a BSID of 0.0 is utilized. At step 35, the MSC determines the device data type, and then uses the BSID and device data type to generate a multicast IP address at 36.

At step 37, the MSC sends the updated device data in an IP multicast message through the PDN 19 to the multicast IP address. At 38, the BS 21 receives the IP multicast message, and at 39, determines whether the update is to be performed immediately, or at a specified time. If a time is specified, the method moves to step 41 where the BS waits for the specified time before moving to step 42. If the update is to be performed immediately, the method moves to step 42 where it is determined whether the update is applicable to a single device or all of the devices of the indicated type. If the update is applicable to a single device, the method moves to step 43 where the BS updates the device data for the identified device. If the update is applicable to all of the devices of the indicated type, the method moves to step 44 where the BS then updates all of the devices at once. At step 45, the BS then updates the MSs operating in the BS's cell.

In a second embodiment of the present invention, an IP broadcast message is used to update radio network data in IP-based BSs. Broadcast-based networks (such as Ethernet) have a broadcast address, which is an IP address that is received by all the hosts on the network. A packet can be transmitted to this address, and it will be picked up by every host on the network. In essence, an IP broadcast message places a single packet on the network, and all interested hosts pick it up.

To the IP packet data network, message traffic is sent, either directly or via routers or otherwise, from the MSC to a plurality of Network Interfaces (NIs), which, as their name implies, act to interface layers on the network. Each NI is associated with a BS. Each BS contains a plurality of User Datagram Protocol (UDP) ports. These ports are said to "listen" for message traffic directed to that particular port. The BS must choose a UDP port number on which to operate. Port numbers range from 1 to 65535, with ports 1 to 1023 being reserved for system applications. Once a given BS identifies message traffic as being directed to it, the BS takes appropriate action in response to the message received. This may include transmitting control messages to the MSs within the BS's coverage cell.

In the second embodiment, each BS is again assigned a BSID in the range of 1 to 5095. The base stations monitor broadcast messages on ports associated with each type of update. For example, the following ports may be associated with the following types of updates:

| PORTS | TYPE OF UPDATE: |
|---|---|
| 10000 | Exchange-level update for DCCH |
| 10000 + BSID | Cell-level update for DCCH |
| 20000 | Exchange-level update for DTC |
| 20000 + BSID | Cell-level update for DTC |

For example, a DCCH device in a BS with a BSID of 765 listens to port 10000 for exchange-level updates, and listens to port 10765 for cell-level updates. A DTC device in the same BS listens to port 20000 for exchange-level updates, and listens to port 20765 for cell-level updates.

When updating radio network data at the exchange level, the MSC sends one message to the broadcast IP address of the network directed to port 10000 for DCCH data, and directed to port 20000 for DTC data. When updating radio network data at the cell level, the MSC sends one message to the broadcast IP address of the network directed to port 10000+BSID for DCCH data, and directed to port 20000+BSID for DTC data. When the message is received, the BS updates the appropriate devices indicated by the device data type in the message.

The BSs in the network must be configured with the ports to monitor. Two ports are required for each device type, one for exchange-level updates and one for cell-level updates. Thus, if the method is limited to updating DCCHs and DTCs, each BS must be configured with four ports (2 for exchange-level updates and 2 for cell-level updates). The number of ports will be greater if the method is applied to additional device types.

Figure 3:
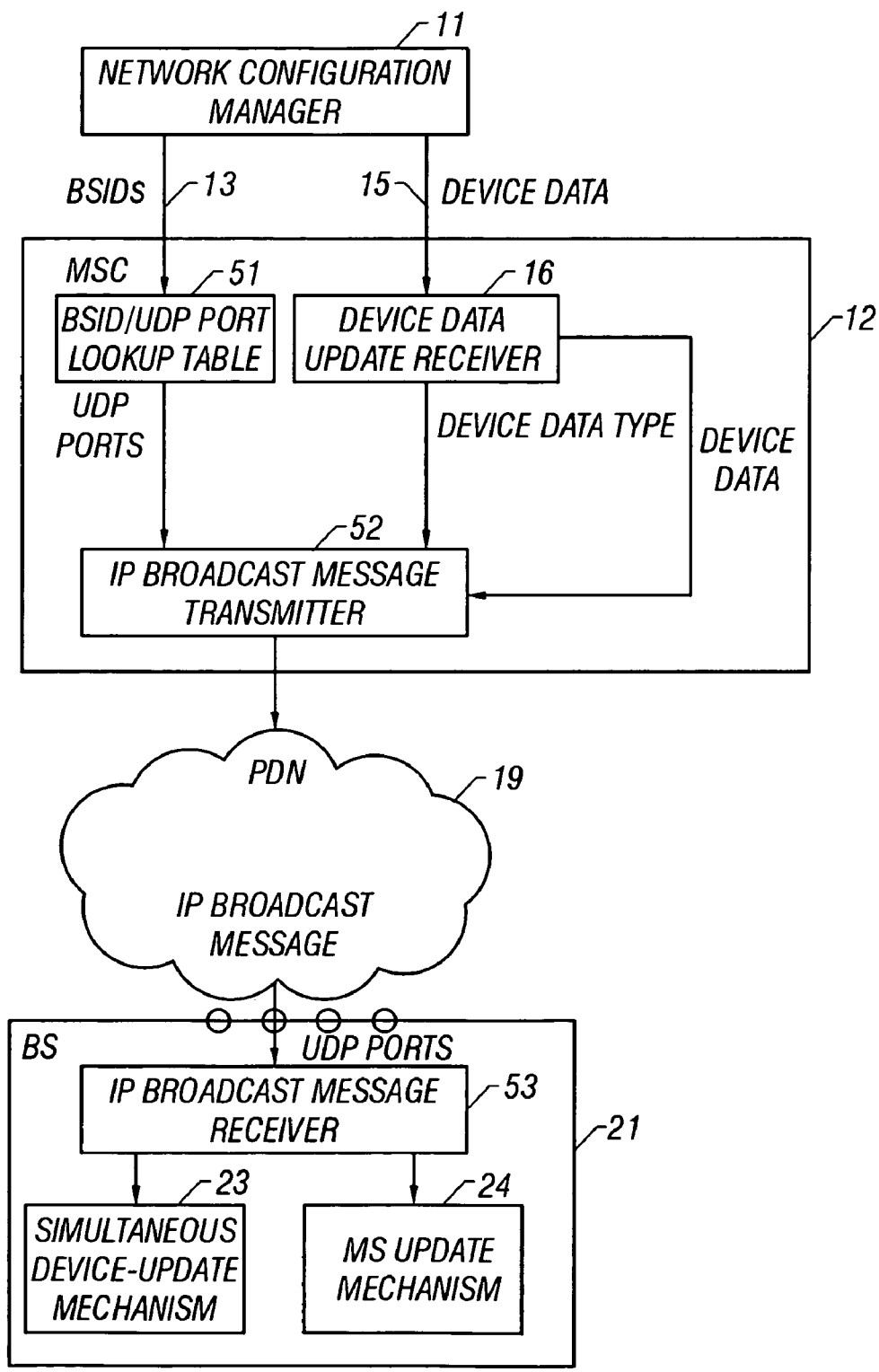
FIG. 3 is a simplified block diagram of a second embodiment of the system of the present invention.

FIG. 3 is a simplified block diagram of the second embodiment of the system of the present invention. Like the first embodiment, the NCM 11 provides the MSC 12 with BSIDs 13 for each of the BSs in the network. The MSC may utilize a lookup table 51 to convert the BSIDs to a number that is added to the base UDP port number for cell-level updates. The NCM also provides updates for device data 15 to the MSC. These updates are received in the Device Data Update Receiver 16. An IP Broadcast Message Transmitter 52 places the device data in an IP message and sends it over the PDN 19 to the broadcast IP address of the network. For updates at the exchange level, the broadcast message is directed to a port such as port 10000 for DCCH data, and directed to a port such as port 20000 for DTC data. When updating radio network data at the cell level, the MSC sends one message to the broadcast IP address of the network directed to port 10000+BSID for DCCH data, and directed to port 20000+BSID for DTC data.

The BS 21 receives the IP broadcast message through the designated port and an IP Broadcast Message Receiver 53. The BS determines whether the update is to be performed immediately, or at a designated time. The BS also determines whether the update is applicable to a single device or all of the devices of the indicated type. If the update is applicable to all of the devices of the indicated type, the Simultaneous Device-Update Mechanism 23 then updates all of the devices at once. The MS Update Mechanism 24 then sends related update information to the MSs operating in the BS's cell.

Figure 4:
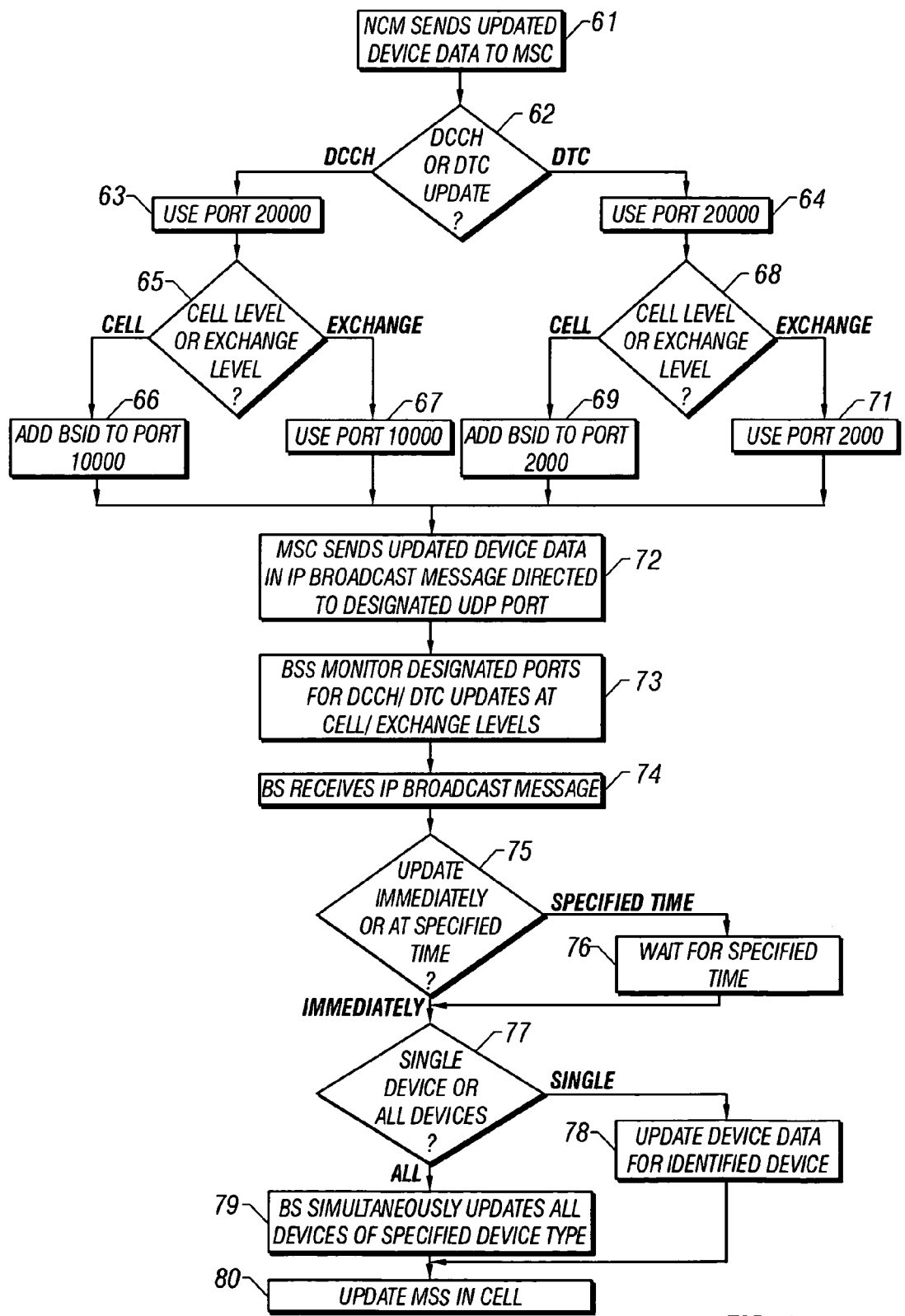
FIG. 4 is a flow chart illustrating the steps of a second embodiment of the method of the present invention.

FIG. 4 is a flow chart illustrating the steps of the second embodiment of the method of the present invention. At step 61, the NCM 11 sends updated device data to the MSC 12. At 62, the MSC determines which type of devices are being updated. For example, the system may be designed to update either DCCHs or DTCs. Therefore, the MSC determines whether the update is for DCCHs or DTC. If the update is for DCCHs, the method moves to step 63 where the MSC may use UDP port 10000 as a base number for DCCH updates. If the update is for DTCs, the method moves to step 64 where the MSC may use UDP port 20000 as a base number for DTC updates.

If the update is a DCCH update, the method moves from step 63 to step 65 where the MSC determines whether the updated data is applicable at the cell level or the exchange level. For cell-level updates, the method moves to step 66 where the BSID for the target cell (converted to a UDP port number) is added to the base number of 10000 to obtained the UDP port number for the IP broadcast message. For exchange-level updates, the method moves from step 65 to step 67 where the base number of 10000 is utilized as the UDP port number for the IP broadcast message.

If the update is a DTC update, the method moves from step 64 to step 68 where the MSC determines whether the updated data is applicable at the cell level or the exchange level. For cell-level updates, the method moves to step 69 where the BSID for the target cell (converted to a UDP port number) is added to the base number of 20000 to obtained the UDP port number for the IP broadcast message. For exchange-level updates, the method moves from step 68 to step 71 where the base number of 20000 is utilized as the UDP port number for the IP broadcast message.

At step 72, the MSC sends the updated device data in an IP broadcast message to the broadcast IP address of the network. The message is directed to the designated UDP port number as determined for the device data type and whether the update is a cell-level update or an exchange-level update. As shown at step 73, the BSs in the network monitor broadcast messages on the UDP ports associated with each type of update. When the IP broadcast message is received at step 74, the BS updates the appropriate devices indicated by the device data type in the message.

At step 75, the BS determines whether the update is to be performed immediately, or at a specified time. If a time is specified, the method moves to step 76 where the BS waits for the specified time before moving to step 77. If the update is to be performed immediately, the method moves to step 77 where it is determined whether the update is applicable to a single device or all of the devices of the indicated type. If the update is applicable to a single device, the method moves to step 78 where the BS updates the device data for the identified device. If the update is applicable to all of the devices of the indicated type, the method moves to step 79 where the BS then updates all of the devices at once. At step 80, the BS then updates the MSs operating in the BS's cell.

It is thus believed that the operation and construction of the present invention will be apparent from the foregoing description. While the system and method shown and described has been characterized as being preferred, it will be readily apparent that various changes and modifications could be made therein without departing from the scope of the invention as defined in the following claims.

What is claimed is:

1. A method of updating radio network data in a plurality of devices deployed within a Base Station (BS), the BS being located in a radio telecommunications network, said method comprising the steps of:
   interfacing the BS with a Mobile Switching Center (MSC) through an Internet Protocol (IP) packet data network;
   assigning the BS an IP address valid on the IP packet data network;
   sending device update data from the MSC to the BS in an IP message with the IP address over the IP packet data network;
   receiving the IP message at the BS from the MSC; and
   updating at least one of the plurality of devices by the BS using the device update data from the IP message wherein the at least one of the plurality of devices is identified by means of the IP message.

2. The method of updating radio network data of claim 1 wherein the step of sending device update data from the MSC to the BS in an IP message includes sending the device update data in an IP multicast message, and the method further comprises, prior to assigning the BS an IP address, the step of joining the BS in a multicast group.

3. The method of updating radio network data of claim 2 wherein the step of sending device update data from the MSC to the BS in an IP message includes sending the device data to a multicast group address that comprises a multicast group designation, a device data type for the device update data, and a Base Station Identification (BSID).

4. The method of updating radio network data of claim 2 wherein the step of joining the BS in a multicast group includes the step of joining the BS in a plurality of multicast groups, each of said multicast groups receiving a different type of device update data.

5. The method of updating radio network data of claim 4 wherein the step of joining the BS in a plurality of multicast groups includes the steps of:
   joining the BS in a first multicast group that receives device update data for Digital Control Channels (DCCHs); and
   joining the BS in a second multicast group that receives device update data for Digital Traffic Channels (DTCs).

6. The method of updating radio network data of claim 1 further comprising, before the step of updating at least one of the plurality of devices by the BS, the step of determining whether the devices are to be updated immediately or at a specified time.

7. The method of updating radio network data of claim 1 wherein the step of updating at least one of the plurality of devices by the BS includes the steps of:
   identifying which ones of the plurality of devices in the BS the device update is directed to; and updating the identified plurality of devices.

8. The method of updating radio network data of claim 1 further comprising the step of assigning the BS to monitor a User Datagram Protocol (UDP) port for device update data.

9. The method of updating radio network data of claim 1 wherein the step of assigning the BS an IP address further comprises assigning each of the devices deployed within the BS an IP address and wherein the step of sending device update data from the MSC to the BS in an IP message with the IP address further includes sending the device update data in the IP message with the IP address to each of the plurality of devices over the IP packet data network.

10. An Internet Protocol (IP) Base Station (BS) in a radio telecommunications network, said BS comprising:
    a plurality of radio network devices deployed therewithin;
    a signaling mechanism for receiving IP messages containing an IP address assigned to the BSC and containing device update data from a Mobile Switching Center (MSC) through an IP packet data network; and
    means within the BS for updating at least one of the plurality of devices with the device update data wherein the at least one of the plurality of devices is identified by means of the IP messages.

11. The IP Base Station of claim 10 wherein the signaling mechanism receives IP multicast messages that contain device update data.

12. The IP Base Station of claim 10 wherein the signaling mechanism includes at least one User Datagram Protocol (UDP) port for monitoring IP broadcast messages containing device update data.

* * * * *